United States Patent [19]
Lund et al.

[11] Patent Number: 5,145,731
[45] Date of Patent: Sep. 8, 1992

[54] COMPOSITE FILMS FREE FROM METAL LAYERS

[75] Inventors: Klaus Lund, Walsrode; Holger Preiss, Visselhoevede, both of Fed. Rep. of Germany

[73] Assignee: Wolff Walsrode AG, Walsrode, Fed. Rep. of Germany

[21] Appl. No.: 495,557

[22] Filed: Mar. 19, 1990

[30] Foreign Application Priority Data

Mar. 29, 1989 [DE] Fed. Rep. of Germany ....... 3910103

[51] Int. Cl.$^5$ ............................................. B29D 22/00
[52] U.S. Cl. ................................ 482/35.4; 428/475.8; 428/476.1; 428/476.3; 428/518
[58] Field of Search ................. 428/35.4, 475.8, 476.1, 428/476.3, 518

[56] References Cited

U.S. PATENT DOCUMENTS

| | | | |
|---|---|---|---|
| 3,136,657 | 6/1964 | Dixler et al. | 427/54.1 |
| 4,284,674 | 8/1981 | Sheptak | 428/476.1 |
| 4,684,573 | 8/1987 | Mueller et al. | 428/349 |
| 4,692,361 | 9/1987 | Johnston | 428/35 |
| 4,746,562 | 5/1988 | Fant | 428/213 |

FOREIGN PATENT DOCUMENTS

| | | |
|---|---|---|
| 0076366 | 4/1983 | European Pat. Off. . |
| 0167956 | 1/1986 | European Pat. Off. . |
| 3035474 | 9/1980 | Fed. Rep. of Germany . |
| 663379A5 | 12/1987 | Switzerland . |

*Primary Examiner*—Edith L. Buffalow
*Attorney, Agent, or Firm*—Sprung Horn Kramer & Woods

[57] ABSTRACT

The composite film contains individual layers of polyvinyl alcohol, a polyolefin, an ethylene/vinyl alcohol and a polyolefin in that order and is comparable in its barrier properties to water vapor and gas with composite films containing metal layers without having any of their disadvantages.

7 Claims, No Drawings

COMPOSITE FILMS FREE FROM METAL LAYERS

This invention relates to composite films which show a particularly good barrier effect against gases and water vapor without having to contain a metal layer, for example of aluminum.

It is known that particularly sensitive products, for example, products which are affected by oxidation or which lose their usefulness through moisture absorption, can be packaged in a vacuum or in an inert gas. To maintain the vacuum or inert gas in the pack for prolonged periods, the wrapping has to be correspondingly gas-tight. It is already known that composite films containing a metal layer, for example of aluminum, can be used for wrapping. However, metal-containing films conceal the contents of the pack, tend to break under flexural stress and show high conductivity through the presence of a metal layer. In addition, they may be susceptible to corrosion.

Composite films which are free from metal layers, comprising barrier layers instead, are known from Ep-A-0 062 815 and 0 208 075. Known metal-free composite films correspond to metal-containing composite films in their properties, but not in all their properties, particularly in regard to the durability of the barrier effect.

The problem addressed by the present invention is to provide an improved composite film which corresponds in its properties to a composite film containing a metal layer, but does not have any of its disadvantages.

The present invention relates to a multilayer film having no metal layer, but containing a barrier layer and showing an improved barrier effect against gas and water vapour, characterized in that it essentially comprises the following layers:

A) a polyvinyl alcohol layer coated with a protective lacquer,
B1) optionally a coupling or adhesive layer,
C1) a polyolefin layer,
B2) optionally a coupling or adhesive layer,
D) an ethylene/vinyl alcohol layer provided on at least one side with a polyamide layer,
B3) optionally a coupling or adhesive layer,
C2) a polyolefin layer.

The polyvinyl alcohol layer A) preferably consists of an ethylene/vinyl acetate copolymer consisting of 40 to 85 mol-% and more especially 60 to 75 mol-% vinyl acetate units of which at least 90% and preferably more than 95 mol-% are hydrolyzed. A particularly preferred polyvinyl alcohol layer consists of more than 95 mol-% hydrolyzed polyvinyl acetate units. The film produced therefrom is biaxially stretched.

In one preferred embodiment, the polyvinyl alcohol layer A) is surrounded by, particularly lacquered with, polyvinylidene chloride (PVDC) on one or, more particularly, both sides.

In one preferred embodiment, the polyvinyl alcohol layer A) optionally lacquered with PVDC is joined to the following layers by a coupling or adhesive layer B1). More particularly, a commercially available two-component polyurethane adhesive is used for the adhesive layer.

However, layer B1) may also be a coupling layer of a polyolefin.

The olefin layer C1) consists essentially of an olefin. Particularly preferred polyolefins are: polyethylene homopolymers and polyethylene copolymers, EBA (=ethylene butyl acrylate), EAA (=ethylene acrylic acid), EEA (=ethylene ethyl acetate) and ionomer resins, more particularly of an ethylene/methacrylic acid copolymer (=EMA) of which the chain molecules are crosslinked by ionic linkage, particularly by zinc ions.

Layer B2) consists essentially of the components shown under B1).

The gas barrier layer D) is, in particular, an ethylene/vinyl alcohol layer preferably containing 40 to 90 mol-% vinyl alcohol, based on the ethylene/vinyl alcohol copolymer.

In one particularly preferred embodiment, the ethylene/vinyl alcohol layer D) has a vinyl alcohol content of 5 to 75 mol-%, based on the ethylene/vinyl alcohol copolymer and is surrounded on one or both sides by a polyamide layer E), for example a polyamide-6. In a particularly preferred embodiment, a coextruded structure of layers E1), D), E2) is introduced into the film according to the invention.

Where a coupling or adhesive layer B3) is present, it may comprise one of the components B1) and B2).

The polyolefin layer C2) consists essentially of one of the components mentioned under layer C1).

In a particularly preferred embodiment, the polyethylene is an LLDPE (linear low-density polyethylene). The individual layers preferably have the following thicknesses in μm:

layer A) optionally PVDC lacquered: 10 to 20 μm,
B1): 0.1 to 10 μm where an adhesive is used,
C1): 5 to 500 μm,
B2): 0.2 to 10 μm where an adhesive is used or 5 to 500 μm where a polyolefin is used for the coupling layer,
layer D): 1 to 50 μm,
layers E): 5 to 100 μm for each layer, layer B3): 0.2 to 10 μm where an adhesive is used,
layer C2): 5 to 500 μm.

In one preferred embodiment, at least one layer of the composite film is stretched. More particularly, layer A) is preferably biaxially stretched.

The individual layers of the composite film may contain the usual additives and auxiliaries, such as for example lubricants, antiblocking agents and antistatic agents, in the usual quantities. Preferred additives are saturated or unsaturated fatty acid amides.

The composite film according to the invention preferably has a total thickness of from 100 to 1500 μm and preferably from 150 to 500 μm. A particularly preferred composite film according to the invention is distinguished by the following properties:

permeability to water vapor (as determined in accordance with DIN 53 122): $<0.1 g/m^2$. day
permeability to oxygen (as determined in accordance with DIN 53 380): $<0.1 cm^3/m^2.d.bar$.

The imperviousness of the film to water vapor and gases is unexpectedly high; a vacuum in a bag of the film according to the invention filled with a given product keeps for an unexpectedly long time.

The film according to the invention is particularly suitable for the packaging of products sensitive to water vapour and gases and for the packaging of products which have to remain in a vacuum. For example, flavorings and the like, such as hops for example, may be stored in bags of the composite film according to the invention for long periods without damage.

EXAMPLE 1

A film according to the invention was produced from the following layers:

A: a 15 μm thick polyvinyl alcohol layer lacquered with PVDC on both sides

B1: a 2 μm thick adhesive layer of a two-component polyurethane adhesive

C1: a 50 μm thick polyolefin layer of polyethylene

B2: a 2 μm thick coupling layer of two-component a polyurethane adhesive

D: an ethylene/vinyl alcohol layer D reinforced with polyamide on both sides (thickness of each of the polyamide layers 37.5 μm, thickness of the ethylene/ vinyl alcohol layer 5 μm)

B3: a 2 μm thick polyurethane adhesive layer

C2: a 100 μm thick polyolefin layer of linear low-density polyethylene.

The individual layers are described more fully in the following:

A: The polyvinyl alcohol layer is biaxially stretched.

B1,B2,B3: Commercially available two-component laminating adhesive.

C1,C2: Blown-film polyethylene of LLDPE, density: 0.921 Melt index: 0.8 g/10 min.

D,E: Coextruded composite film of polyamide-6 and ethylene/vinyl alcohol copolymer.

EXAMPLE 2

A film according to the invention was produced from the following layers:

A: a 15 μm thick polyvinyl alcohol layer lacquered with PVDC on both sides

B1: a μm thick adhesive layer of a two-component polyurethane adhesive

C1: a 75 μm thick polyolefin layer of polyolefin

B2: a 50 μm thick coupling layer of low-density polyethylene

D: an ethylene/vinyl alcohol layer D reinforced with polyamide on both sides (thickness of each of the polyamide layers 37.5 μm, thickness of the ethylene/ vinyl alcohol layer 5 μm)

B3: a 2 μm thick polyurethane adhesive layer

C2: a 100 μm thick polyolefin layer of linear low-density polyethylene.

The individual layers correspond to those of Example 1, except that layer B2 consists of a low-density polyethyene for extrusion lamination.

The film was produced in known manner by adhesive lamination and coextrusion.

After storage (temperature 23°C./50% rel. humidity), the film was subjected to the following tests and produced the results shown:

1) Test for permeability to the gases oxygen, nitrogen and carbon dioxide.

Test atmosphere: 23°C.; 0% rel. humidity.

Results: for all the gases tested, permeability is $<0.1 cm^3/m^2.day.bar$ and is below the detection limit of standard measurement techniques.

2) Test for permeability to water vapor:

Test atmosphere: 23°C.; 85% rel. humidity.

Result: permeability $<0.1 g/m^2.d$.

We claim:

1. A multilayer film having no metal layer, but containing a barrier layer and showing an improved barrier effect against gas and water vapour, wherein it consists essentially of the following layers:

A) a polyvinyl alcohol layer coated with a protective lacquer,

B1) optionally a coupling or adhesive layer,

C1) a polyolefin layer,

B2) optionally a coupling or adhesive layer,

D) an ethylene/vinyl alcohol layer provided on at least one side with a polyamide layer, B3) optionally a coupling or adhesive layer, C2) a polyolefin layer.

2. A composite film as claimed in claim 1, wherein layer A) is lacquered on both sides with PVDC and layer D) is reinforced on both sides with a polyamide layer.

3. A composite film as claimed in claim 1, wherein the individual layers have the following thicknesses:

layer A): 10 to 20 μm, including the lacquer layer,

B1): 0.1 to 10 μm where an adhesive is used,

C1): 5 to 500 μm,

B2): 0.2 to 10 μm where an adhesive layer is used or 5 to 500 μm where a coupling layer is used, layer D): 1 to 50 μm, layers E): 5 to 100 μm, layer B3): 0.2 to 10 μm where an adhesive layer is used, layer C2): 5 to 500 μm.

4. A composite film as claimed in claim 1, wherein at least individual layers are stretched.

5. A composite film as claimed in claim 1, wherein layer A is biaxially stretched.

6. A composite film as claimed in claim 1, wherein layers B1 and B3 consist essentially of a two-component polyurethane adhesive.

7. A method for the packaging of products in the absence of water vapor and gas wherein a composite film claimed in claim 1 is used.

* * * * *